United States Patent [19]
Petinaux et al.

[11] 3,886,178
[45] May 27, 1975

[54] METHOD OF PREPARATION OF INDOLE

[75] Inventors: Marcel Petinaux; Jacques Metzger; Jean-Pierre Aune, all of Marseille; Hubert Knoche, Meyzieu, all of France

[73] Assignee: Entreprise de Recherches et d'Activities Petrolieres ELF, Paris, France

[22] Filed: May 30, 1973

[21] Appl. No.: 365,110

[30] Foreign Application Priority Data
June 7, 1972  France .............................. 72.20404

[52] U.S. Cl. ............................................. 260/319.1
[51] Int. Cl. ............................................. C07d 27/56
[58] Field of Search .................................. 260/319.1

[56] References Cited
UNITED STATES PATENTS
3,732,245    5/1973    Batch et al...................... 260/319.1

Primary Examiner—Joseph A. Narcavage
Attorney, Agent, or Firm—Cameron, Kerkam, Sutton, Stowell & Stowell

[57] ABSTRACT

In a method of preparation of indole from N (β-hydroxyethyl) aniline, a first step consists in esterifying the alcohol function of N (β-hydroxyethyl) aniline in an organic medium and at a temperature within the range of 0° to 200°C and a second step consists in subjecting the ester which has been prepared during the first step to thermal cracking at a temperature within the range of 650° to 900°C.

11 Claims, No Drawings

METHOD OF PREPARATION OF INDOLE

This invention relates to a novel method of preparation of indole in two steps.

Indole is a well-known chemical compound and the very numerous methods of preparation of this compound have been extensively described in the literature.

Several methods of preparation are based on the cyclization of ortho substituted nitrated derivatives of benzene (aniline and nitrobenzene). It has been proposed, for example, to prepare indole by cyclization of vinylbenzene ortho-amino-chloride as well as by cyclization of ortho-nitro-phenylacetic aldehyde, of ortho-nitro-cinnamic acid or of ortho-nitro-ethylbenzene.

Further methods of preparation of indole from monosubstituted derivatives of benzene have been proposed. Particularly noteworthy are the condensation of styrene with ammonia and the cyclization of the phenylhydrazones, e.g., cyclization with ammonia as a starting agent followed by decarboxylation of pyruvic acid phenylhydrazone in the presence of zinc chloride (Fischer reaction).

All these methods are subject to many disadvantages either of a technical character such as low yield, low rates and difficulties in carrying out reactions or else of an economic nature such as the cost of starting materials which make said methods unattractive.

The object of the present invention is to overcome these disadvantages by proposing a method of preparation of indole from inexpensive starting materials in two steps which permit a good final yield.

This invention relates to a novel method of preparation of indole from N-phenyl-monoethanol-amine or N (β-hydroxyethyl) aniline corresponding to the formula:

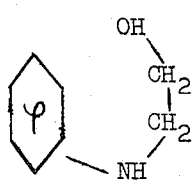

The method in accordance with the invention is characterized in that, in a first step, the alcohol function of N (β-hydroxyethyl) aniline is esterified in an organic medium and at a temperature within the range of 0° to 200°C and then, in a second step, the ester which has been prepared during the first step is subjected to thermal cracking at a temperature within the range of 650° to 900°C so that a mixture consisting of a major proportion of indole is finally obtained.

The starting compound, namely N (β-hydroxyethyl) aniline, is obtained in known manner by action of ethylene oxide on aniline in the following reaction:

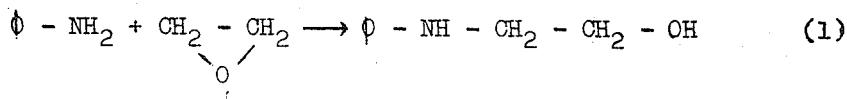

The first step of the method according to the invention consists in esterifying the alcohol function of the starting compound. The ester which is obtained corresponds to the following formula:

$$\phi - NH - CH_2 - CH_2 - O - R$$

where R is a residue derived from the acid employed in the esterification process. To this end, it is possible to make use either of a mineral acid or of an organic acid. By mineral acid is meant not only conventional acid but also the derivatives of these acids such as the mineral oxychlorides and the polyacids in which the acidities have been partially neutralized. The term "organic acid" is understood to mean the acids as well as their equivalents, acid anhydride or acid chloride.

Among the organic acids, the choice of the acid to be employed in the esterification process is very wide. Practically all the organic acids are suitable and the choice will be guided by considerations of reaction yield and cost of products.

Among the mineral acids, all the acids which make it possible to obtain the ester as hereinabove defined are suitable: however, an acid having low strength and volatility will advantageously be chosen.

A mineral polyacid such as boric acid or phosphoric acid is preferably employed.

There can be mentioned by way of example:
Mineral acids: boric, phosphoric, silicic, carbonic and so forth.
Organic acids: formic, acetic, benzoic, oxalic, chlorosulphonic, phthalic, benzenesulphonic, toluenesulphonic, and so forth.

When making use of a mineral acid such as boric, the esterification reaction is as follows:

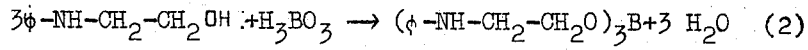

When employing an acid chloride, the esterification reaction is as follows:

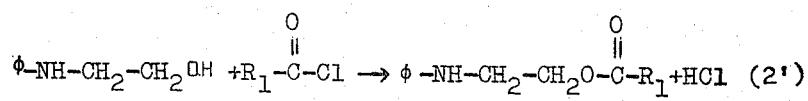

This esterification reaction is carried out in an organic liquid medium. In fact, in order that reaction (2) or (2') should be as complete as possible, it is preferable to eliminate from the reaction medium the compound which is formed beside the ester during the course of the reaction. As a general rule, this compound is water (reaction (2)); however, when esterification is carried out by means of an organic acid chloride or a mineral oxychloride, the compound produced (reaction (2')) is hydrochloric acid.

Esterification is therefore preferably carried out in an organic solvent medium which is inert with respect to the reaction or in other words is not capable of taking part in the esterification process, which permits ready removal of the water in the case of standard esterification, for example by azeotropic extraction.

If the esterification process is carried out by means of an acid chloride or an oxychloride, it is an advantage to eliminate the hydrochloric acid produced by neutralizing this latter with a basic organic compound which is present in the medium. This basic compound such as an amine, for example, can alone serve as an organic reaction medium or can be employed in a mixture with another solvent.

When esterification is carried out by means of organic acid compounds, it is possible to employ said organic acid compounds as a reaction medium, which clearly does not remove the possibility of utilization of an accessory solvent.

The organic solvent which serves as reaction medium and is in the liquid state at the reaction temperature will preferably be selected from the aromatic solvents such as benzene, toluene, the xylenes, nitrobenzene or the chlorinated solvents such as tetrachloride, trichloroethylene, chloroform, and so forth.

The basic organic solvent which is in the liquid state at the reaction temperature and is intended to effect neutralization of the hydrochloric acid if necessary will be selected, for example, from pyridine, triethanolamine, and so forth.

The esterification reaction is carried out at a temperature which is usually of a fairly low order and is a function of the physical properties of the ester to be prepared and of the reaction medium employed. This temperature is lower than 200°C and usually within the range of 0° to 120°C.

On completion of this first step, the ester is in the midst of the organic reaction medium and should preferably be separated from said medium prior to introduction in the second step.

Any known means can be employed for carrying out the separation aforesaid. For example, the ester can be extracted from the reaction medium by simple distillation or by vacuum distillation. It is also possible to separate the ester by precipitation. To this end, water is added to the reaction mixture, with the result that the product can readily be obtained in solid form after separation of the aqueous phase. It is then an advantage to purify the product which has been obtained. These methods of separation are clearly given by way of example only and are not intended to imply any limitation.

This intermediate separation step does not constitute an essential requirement. In fact, the raw mixture derived from the first step can be introduced directly in a second step in order to obtain the indole. However, this direct introduction is attended by a major disadvantage, namely a loss of yield in the final product which is not negligible.

The ester which is prepared during the first step is accordingly either in solid form or in liquid form. This ester is then introduced into the second reaction zone in which thermal cracking of said ester is carried out.

Thermal cracking is performed in the conventional manner at a temperature which is usually within the range of 650° to 900°C. In order to prevent oxidation of the different products, cracking must be carried out in an oxygen-free atmosphere. A carrier gas which is intended to entrain the cracked products can be introduced into the second reaction zone. Said carrier gas is selected from the usual inert gases: nitrogen, rare gases, carbon dioxide gas and the like. Cracking of the ester can also be carried out in an inert atmosphere at low pressure.

The ester can be introduced into said second reaction zone either in the liquid state or in the solid state, depending on the method chosen for the separation at the end of the first step, or even in the gaseous state by vaporizing the ester prior to introduction. Essentially for material reasons, it is found preferable to introduce the ester in liquid form. To this end, the solid ester is dissolved in a neutral solvent such as benzene.

The flow rate of inert gas to be introduced into the reaction vessel is a function of the quantity of cracked products and therefore of the quantity of ester introduced. The flow rate of inert gas is usually such that the molar ratio (inert gas/ester) is within the range of 0 to 150.

If thermal cracking is carried out in vacuo, the pressure within the reaction vessel can be a few millimeters of mercury.

The method of preparation of indole as described in the foregoing can naturally be applied to the preparation of substituted compounds of indole such as the derivatives of alkylated indole at position 3 and corresponding to the formula

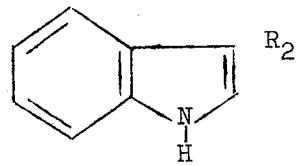

The starting product employed in the preparation of these products is accordingly an N ($\beta$-hydroxy-$\beta$-alkylethyl) aniline having the formula

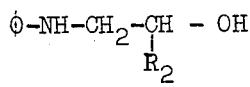

as obtained in accordance with the standard reaction indicated in the foregoing, by action of an epoxy resin having the formula

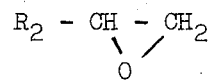

such as, for example, propylene oxide on aniline.

Indole is a product which is very widely employed in many industries such as the pharmaceutical industry or perfumery.

EXAMPLES

Example 1

First step: after having prepared the N ($\beta$-hydroxyethyl) aniline, this latter is esterified by $H_3BO_3$ in a reflux process in benzene at a temperature in the vicinity of 80°C.

After evaporation of the solvent, the ester is distilled at low pressure. The temperature of this highly viscous liquid increases to 200°C at a pressure of 0.4 mm of mercury.

The yield of ester with respect to the converted alcohol is 98 %.

Second step: the boric ester obtained is introduced at a flow rate of 5 ml/h into a furnace at a temperature of 770°C. The cracking reaction is conducted in the presence of nitrogen, the rate of introduction of which is 19 l/h.

The final composition of the reaction medium is (by weight)

| | |
|---|---|
| indole | 58 % |
| aniline | 12 % |
| benzonitrile | 7 % |

-Continued

| | |
|---|---|
| quinoline | 3 % |
| Other unidentified products | 20 % |

EXAMPLE 2

Example 1 is repeated by esterifying aminoalcohol with phosphorus oxychloride in benzene in the presence of pyridine at a temperature which is slightly lower than 10°C. After refluxing of the reaction medium, the pyridine hydrochloride is dissolved in water and the precipitated phosphate is washed with acetone.

This ester is a white powder which fuses with decomposition at 184° – 185°C.

The ester is dissolved in benzene (50 % by weight), then introduced into the furnace at a rate of 8 ml/h.

The other operating conditions are:

| | |
|---|---|
| Cracking temperature | 760°C |
| Flow rate of nitrogen | 20 l/h |

The final composition of the reaction medium is:

| | |
|---|---|
| Indole | 25 % (by weight) |
| Aniline | 40 % |
| Benzonitrile | 7 % |
| Quinoline | 7 % |
| Other products (unidentified) | 21 % |

EXAMPLE 3

The aminoalcohol of Example 1 is esterified with formic acid at 98 % in a reflux process over a period of 24 hours.

After washing the reaction mixture with a solution of bicarbonate, the formic ester is separated by vacuum distillation (0.5 mm Hg) at 150°C.

The liquid formic ester is introduced into the cracking furnace at a rate of 8 ml/h. The operating conditions of the thermal cracking process being the same as those of Example 1, the final mixture obtained is as follows:

| | |
|---|---|
| Indole | 15 % (by weight) |
| Aniline | 32 % |
| Benzonitrile | 18 % |
| Quinoline | 5 % |
| Other products (unidentified) | 30 % |

EXAMPLE 4

The aminoalcohol of Example 1 is esterified with benzoyl chloride in a reflux process in pyridine. The benzoic ester is precipitated by addition of water then washed and recrystallized in 90 % ethanol. White needles which fuse at 80°C are thus obtained.

After dissolving as in Example 2, the benzoic ester is subjected to thermal cracking under the operating conditions of Example 1. The rate of introduction of the ester is 8 ml/h.

The final mixture is as follows:

| | |
|---|---|
| Indole | 20 % (by weight) |
| Aniline | 7 % |
| Benzonitrile | 15 % |
| Quinoline | 30 % |
| Other products (unidentified) | 28 % |

EXAMPLE 5

The aminoalcohol of Example 1 is esterified by acetic anhydride in the presence of zinc chloride.

The acetic ester is collected by distillation at 133°C under 0.3 mm of mercury. This ester is introduced into the cracking furnace at a rate of 8 ml/h. The conditions of cracking are those of Example 1.

The final mixture obtained is as follows:

| | |
|---|---|
| Indole | 50 % (by weight) |
| Aniline | 3 % |
| Benzonitrile | 13 % |
| Quinoline | 6 % |
| Other products (unidentified) | 28 % |

EXAMPLE 6

The boric ester of Example 1 is cracked at 740°C. The furnace is supplied at a rate of 5 ml/h of ester without nitrogen.

The balance of the final mixture is as follows:

| | |
|---|---|
| Indole | 45 % (by weight) |
| Aniline | 22 % |
| Benzonitrile | 17 % |
| Quinoline | 5 % |
| Other products (unidentified) | 11 % |

What we claim is:

1. A method of preparation of indole from N-($\beta$-hydroxyethyl) aniline wherein, in a first step, the alcohol function of N-($\beta$-hydroxyethyl) aniline is esterified with a mineral or an organic acid in an organic solvent which is inert with respect to the esterification reaction and at a temperature within the range of 0° to 200°C. and then, in a second step, the ester which has been prepared during the first step is subjected to thermal cracking at a temperature within the range of 650° to 900°C.

2. A method according to claim 1 wherein, during the first step, a mineral acid is employed in order to esterify the N ($\beta$-hydroxyethyl) aniline.

3. A method according to claim 2, wherein the acid is boric acid.

4. A method according to claim 2, wherein the acid is a mineral oxychloride.

5. A method according to claim 1 wherein, during the first step, an organic acid is employed in order to esterify the N ($\beta$-hydroxyethyl) aniline.

6. A method according to claim 5, wherein the acid is an acid chloride.

7. A method according to claim 4, wherein the reaction medium contains an aminated organic base.

8. A method according to claim 1 wherein, during the second step, a neutral carrier gas is introduced into the cracking zone.

9. A method according to claim 8, wherein said gas is nitrogen.

10. A method according to claim 1 wherein, during the second step, the product is cracked without inert carrier gas.

11. A method according to claim 1 wherein, during the second step, cracking of the ester is carried out at low pressure.

* * * * *